(12) United States Patent
McCain

(10) Patent No.: US 6,796,079 B1
(45) Date of Patent: Sep. 28, 2004

(54) SOLUBLE, MOVING, SOUND PRODUCING BAIT APPARATUS AND METHOD

(76) Inventor: J. Scott McCain, P.O. Box 996, Minden, LA (US) 71058

( * ) Notice: Subject to any disclaimer, the term of this patent is extended or adjusted under 35 U.S.C. 154(b) by 12 days.

(21) Appl. No.: 10/295,477

(22) Filed: Nov. 15, 2002

(51) Int. Cl.$^7$ .............................................. A01K 85/01
(52) U.S. Cl. .......................... 43/42; 43/42.06; 43/42.31
(58) Field of Search ...................... 43/42, 42.06, 42.31; 426/1; 424/84

(56) References Cited

U.S. PATENT DOCUMENTS

| | | | | |
|---|---|---|---|---|
| 1,795,238 A | * | 3/1931 | Spence | 426/1 |
| 2,827,376 A | * | 3/1958 | Breuer | 43/42 |
| 3,322,544 A | * | 5/1967 | Yakstis | 426/1 |
| 3,359,114 A | * | 12/1967 | Witteman et al. | 43/42 |
| 3,410,689 A | * | 11/1968 | Nathan | 43/42.06 |
| 4,245,420 A | * | 1/1981 | Carr | 43/42.06 |
| 4,258,065 A | * | 3/1981 | Ciulla | 426/1 |
| 4,576,821 A | * | 3/1986 | Smith et al. | 426/1 |
| 4,589,223 A | * | 5/1986 | Hastings | 43/42.24 |
| 4,732,766 A | * | 3/1988 | Lindgard | 426/1 |
| 4,741,904 A | * | 5/1988 | Smith et al. | 426/1 |
| 4,826,691 A | * | 5/1989 | Prochnow | 426/1 |
| 4,828,829 A | * | 5/1989 | Bethshears | 424/84 |
| 4,874,607 A | * | 10/1989 | Hodgson | 426/84 |
| 4,890,411 A | * | 1/1990 | Buccilli et al. | 43/42.06 |
| 4,981,711 A | * | 1/1991 | Kearns et al. | 426/1 |
| 5,089,277 A | * | 2/1992 | Prochnow | 426/1 |
| 5,171,587 A | * | 12/1992 | Caprio et al. | 426/1 |
| 5,171,588 A | * | 12/1992 | Ishihara et al. | 426/1 |
| 5,201,138 A | * | 4/1993 | Watkins, Jr. | 43/42.06 |
| 5,415,862 A | * | 5/1995 | Bethshears et al. | 43/42.31 |
| 5,827,551 A | * | 10/1998 | Prochnow et al. | 43/42.06 |
| 6,113,895 A | | 9/2000 | McCain | |
| 6,298,595 B1 | * | 10/2001 | Friedlob | 43/42.06 |
| 2003/0167675 A1 | * | 9/2003 | Noguchi et al. | 43/42 |

FOREIGN PATENT DOCUMENTS

| | | | | |
|---|---|---|---|---|
| AU | 645238 B1 | * | 1/1994 | 43/42 |
| EP | 137748 B1 | * | 4/1985 | |
| FR | 2145785 B1 | * | 2/1973 | |
| FR | 2683704 B1 | * | 5/1993 | |
| GB | 2056231 B1 | * | 3/1981 | |
| JP | 10-323144 B1 | * | 12/1998 | |
| WO | WO-83/00984 B1 | * | 3/1983 | |
| WO | WO-95/17086 B1 | * | 6/1995 | |

* cited by examiner

*Primary Examiner*—Darren W. Ark
(74) *Attorney, Agent, or Firm*—J. Nevin Shaffer, Jr.

(57) ABSTRACT

A soluble, moving, sound producing bait apparatus and method (10) includes, according to one embodiment of the invention, a water soluble completely biodegradable medium (12). A water soluble reactant (14) is dispersed within medium (12). According to one embodiment, water soluble reactant (14) includes $CO_2$ charged sugar crystals (16). When introduced to water, medium (12) dissolves as do sugar crystals (16). As sugar crystals (16) begin to dissolve, the trapped $CO_2$ escapes at the weakest point creating shattered pieces (18) of sugar crystals (16) and producing an audible sound (20). In addition to the creating sound (20), the reaction of the water soluble reactant (14) with water causes movement (22). According to another embodiment of the invention, a fish attractant (28) is added to medium (12).

35 Claims, 1 Drawing Sheet

SOLUBLE, MOVING, SOUND PRODUCING BAIT APPARATUS AND METHOD

TECHNICAL FIELD OF THE INVENTION

This invention relates to a soluble, moving, sound producing bait apparatus and method. In particular, according to one embodiment of the invention, the invention relates, in fishing systems, to a water soluble completely biodegradable medium. A water activated reactant is dispersed in the water soluble medium such that the reactant produces sound and creates movement of the water soluble medium in the presence of water.

BACKGROUND OF THE INVENTION

Every day, the art and science of fishing are practiced by millions around the world. From the beginning, fishermen and women have attempted to develop means and methods for the successful capture of fish. Technology has impacted commercial and recreational fishing in a large way. Nonetheless, a need exists for environmentally friendly methods and means for catching fish. Applicant's biodegradable lure as set forth in U.S. Pat. No. 6,113,895, ARTIFICIAL SURFACE ACTIVE LURE APPARATUS AND METHOD (incorporated herein in its entirety by this reference) addresses the problems associated with the use of non-biodegradable lures and the like. Until Applicant's invention as set forth in US. Pat. No. 6,113,895, the lake, river, and ocean beds of the world were destined to become covered with an impervious layer of non-biodegradable plastic worm fishing lures.

A major challenge in fishing is attracting fish to the user's fishing system. As used herein, the term "fishing system" includes systems for catching fish including traps, nets, poles, lines, reels, hooks, lures, and bait in combination, all as known in the art. A wide variety of combinations of these devices and various methods of presenting them to fish have been utilized. The ultimate objective, however, has always been to provide a fish bait that not only is interesting to fish if they happen upon it, but which actually attracts fish to the bait. Adding natural and chemical fish "attractants" to fishing systems enhances the chances of catching fish and is particularly successful when utilized as set forth in Applicant's U.S. Pat. No. 6,113,895.

In spite of all the improvements to date, however, a need still exists for an apparatus and method for attracting fish that appeals to all the senses of a fish. That is to say, a need exists for a means and method for attracting fish by appealing to the fish's sense of taste, sight, and sound. Such a means and method must be environmentally sensitive, inexpensive and easy-to-use.

SUMMARY OF THE INVENTION

Accordingly, the soluble, moving, sound producing bait apparatus and method according to an embodiment of the present invention, includes a water soluble completely biodegradable medium. A water activated reactant is dispersed within the water soluble medium. The reactant is conformed to produce sound and create movement of the water soluble medium in the presence of water. According to another embodiment of the invention, a fish attractant is also dispersed within the water soluble medium. According to another embodiment of the invention, the water soluble completely biodegradable medium comprises a combination of vegetable oil, cellulose and wood flour.

According to one embodiment of the invention, the water activated reactant is a gas trapped in a water dissolvable medium. In accordance with a further aspect of the invention, $CO_2$ charged sugar crystals arc dispersed in the water soluble medium. In a further aspect of the invention, the water activated reactant includes a combination of chemical reactants that are activated in the presence of water. According to one embodiment of the invention, the water activated reactant is formed from a combination of sodium bicarbonate and citric acid. According to another embodiment of the invention, the fish attractant is selected from a group including amino acids, glycine, analine and proline.

According to another aspect of the invention, the fishing system includes a hook and a portion of the water soluble biodegradable medium with dispersed reactant(s) attached to the hook and the hook is introduced to water. In accordance with other aspects of the invention, the fishing system includes lures, hooks, and bait and a portion of the water soluble completely biodegradable medium with dispersed reactant(s) attached to or formed thereon.

In another embodiment, a method of attracting fish with a fishing system including a hook includes the steps of forming a one-hundred percent biodegradable dough from a mixture of vegetable oil, cellulose and wood flour. $CO_2$ charged sugar crystals are dispersed in the dough. A mixture of sodium bicarbonate and citric acid are dispersed in the dough. A fish attractant is dispersed in the dough. Thereafter, a portion of the dough is molded onto the hook and the hook is placed in water.

As used herein, the terms "one hundred percent" and "completely" biodegradable are used to define a substance that degrades into harmless natural elements in the presence of water leaving no undissolved or undegradable substance.

DESCRIPTION OF THE DRAWINGS

Other objects, features and advantages of the present invention will become more fully apparent from the following detailed description of the preferred embodiments, the appended claims and the accompanying drawings in which:

DESCRIPTION OF THE PREFERRED EMBODIMENTS

Figure 1:
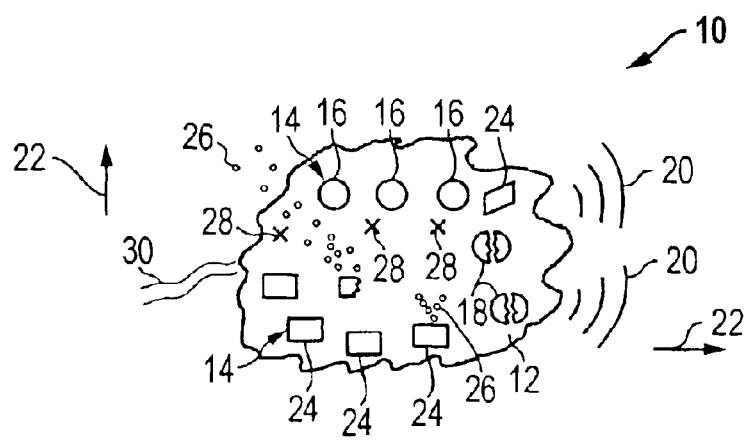
FIG. 1 is a schematic of the soluble, moving, sound producing bait of the present invention according to one embodiment.

According to an embodiment of the invention, referring now to FIG. 1, soluble, moving, sound producing bait apparatus 10 includes a water soluble completely biodegradable medium 12. Again, as used herein, "completely biodegradable" is used to identify a medium that is environmentally sensitive and that degrades into harmless elements upon dissolving in water. Such a water soluble medium 12 may be any medium 12 now known or hereafter developed. According to one aspect of the invention, the water soluble biodegradable medium 12 is prepared from a combination of vegetable oil, cellulose and wood flour. The proportions of these ingredients may be varied as desired so long as a resulting medium is a paste and/or dough-like creation. By way of example only and not by limitation, the following approximate proportions have been found to be effective: 40–50 percent vegetable oil, 20–30 percent cellulose, and 5–10 percent wood flour.

A water soluble reactant 14 is dispersed in the water soluble medium 12. Water soluble reactant 14 reacts with water to produce sound and create movement of the water soluble medium 12 in the presence of water. Water soluble reactant 14 may be any water soluble reactant now known or hereafter developed. According to one embodiment of the invention, a water soluble reactant 14 comprises a gas trapped in a water dissolvable medium. By way of example only and not by limitation, according to one aspect of the invention, water soluble reactant 14 consists of $CO_2$ charged sugar crystals 16. The $CO_2$ charged sugar crystals 16 are represented by the spheres or circles in FIG. 1. In this embodiment, molten sugar is charged with $CO_2$ under pressure. When the pressure is released, the sugar crystallizes trapping the $CO_2$. The $CO_2$ charged sugar crystals 16 are then dispersed within water soluble biodegradable medium 12. When, thereafter, water soluble biodegradable medium 12 is placed in water, the water causes the sugar to begin to dissolve. The trapped $CO_2$ escapes at the weakest point, shattering the sugar crystals 16 and causing a popping sound. As shown in FIG. 1, the dissolving $CO_2$ charged sugar crystals 16 are broken apart into shattered pieces 18 causing an audible sound 20 and movement in any of a number of directions indicated by arrows 22, for example only. Obviously, any other type of gas retaining medium now known or hereafter developed may be utilized.

According to another embodiment of the invention, water soluble reactant 14 includes a combination of chemical reactants 24 that are activated in the presence of water. As utilized herein, the term "activated" means that a resulting chemical reaction occurs such that sound and movement are created during the reaction. According to one embodiment, for example only and not by way of limitation, the chemical combination includes a combination of sodium bicarbonate and citric acid. This combination of chemical reactants 24 is represented by rectangles in FIG. 1. When this combination of chemical reactants 24, sodium bicarbonate and citric acid, are dispersed within water soluble completely biodegradable medium 12 nothing happens. That is, no reaction occurs until such time as the water soluble biodegradable medium 12 is placed in water. At that point the combination of chemical reactants 24, sodium bicarbonate and citric acid in a preferred embodiment, reacts by dissolving and releasing $CO_2$. This release of gas is in the form of escaped gas bubbles 26. Escaped gas bubbles 26 cause audible sound 20 as well as movement in the direction of movement arrows 22, for example only.

According to another embodiment of the invention, water soluble reactant 14 includes both the $CO_2$ charged sugar crystals 16 as well as the combination of chemical reactants 24. Together, an audible sound 20 is produced that includes popping and fizzing noises and the combination provides for greater movement of the water soluble medium 12 in the water. Any proportion of these soluble reactants 14 is appropriate according to the user's desires and personal preferences when mixed with the water soluble biodegradable medium 12. By way of example only and not by limitation, an appropriate proportion has been found to be 10–20 percent $CO_2$ charged sugar crystals 16 and 5–10 percent sodium bicarb/citric acid chemical reactants 24.

According to another embodiment of the invention, a fish attractant 28 is also dispersed within water soluble biodegradable medium 12. Fish attractant 28 is represented by "X"s in FIG. 1. Any type of fish attractant 28 now known or hereafter developed is appropriate. According to one embodiment of the invention, fish attractant 28 is selected from a group including amino acids, glycine, analine and proline. Whenever fish attractant 28 is utilized, as water soluble completely biodegradable medium 12 dissolves in water, fish attractant 28 releases a scent 30 into the water. As a result, in accordance with an embodiment of the present invention, the soluble, moving, sound producing bait 10 creates an audible sound 20, movement 22, and a water soluble fish attracting smell/scent 30.

Figure 2:
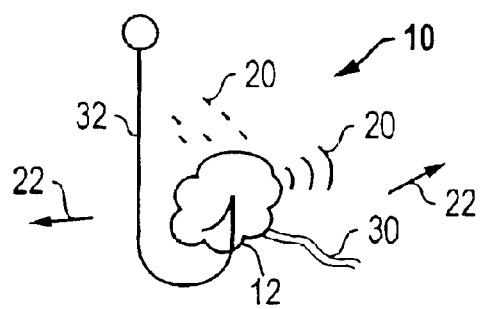
FIG. 2 is a schematic of the invention of FIG. 1 in use with a hook.

Referring now to FIG. 2 according to one embodiment of the invention, a fishing system includes a hook 32. Hook 32 may be any type of fishing hook now known or hereafter developed for use in fishing. In use, after water soluble completely biodegradable medium 12 is formed into a paste and water soluble reactant(s) 14 is/are dispersed within the paste, a portion of water soluble biodegradable medium 12 is formed around the hook 32. Once hook 32 with the portion of water soluble medium 12 formed around it is placed in water, water soluble material 12 begins to dissolve, as discussed above. When this happens, audible sound 20, of at least one type as discussed above or others, and movement is created. Additionally, in one embodiment, fish attractant 28 releases a scent 30 as the water soluble biodegradable medium 12 dissolves in water. Again, the action of the water dissolving the medium 12 causes movement in the direction of movement arrows 22. Obviously, the movement discussed herein is not limited to straight line motion in the direction of the arrows 22 shown in the figures. Instead these arrows are representative only. Movement created in accordance with the present invention is much more erratic and in multiple directions such that the water soluble biodegradable medium 12 actually jumps around in the water in multiple directions as it dissolves.

Figure 3:
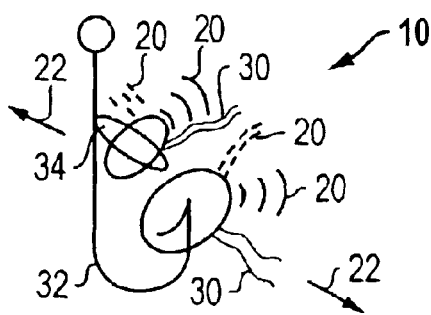
FIG. 3 is a schematic of the invention of FIG. 1 in use with a lure and a hook.

FIG. 3 illustrates another embodiment of the invention wherein a lure 34 is utilized in a fishing system. According to this embodiment, a portion of biodegradable medium 12 in combination with dispersed water soluble reactant(s) 14 is formed around lure 34. Preferably, lure 34 may be attached to hook 32. Obviously, lure 34 may be attached to the hook 32 or any other portion of the fishing system (not shown) as desired. According to one embodiment of the invention, a portion of the water soluble biodegradable medium 12 with water soluble reactant(s) 14 may be attached by pressing it around the lure 34 and onto the hook 32 as discussed. In any event, soluble, moving, sound producing bait 10 of the present invention is one hundred percent completely biodegradable when immersed in water and, as it dissolves, it produces audible sound 20 of a variety of types as previously discussed and moves in the direction of movement arrows 22 as shown. Obviously, this movement is imparted to the hook 32 and/or lure 34 as well. Additionally, according to one embodiment, a fish attractant 28 is also dispersed within water soluble medium 12 such that a scent 30 is released as the medium 12 dissolves.

Figure 4:
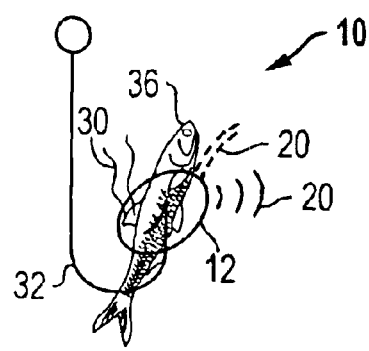
FIG. 4 is a schematic of the invention of FIG. 1 in use with bait and a hook.

FIG. 4 illustrates another embodiment of the invention wherein a bait 36 is attached to hook 32 and the soluble, moving, sound producing bait 10 of the present invention, in the form of a portion of the water soluble biodegradable medium 12 with dispersed water reactant(s) 14, is formed around bait 36. Again, in this embodiment, as medium 12 dissolves, sound 20 is produced, movement is imparted to the bait 36 and hook 32 and scent 30, preferably, is released.

By way of further explanation and discussion, a method of attracting fish with a fishing system including a hook 32 includes the steps of forming a one hundred percent biodegradable dough 12 from a mixture of vegetable oil, cellulose and wood flour. Thereafter, $CO_2$ charged sugar crystals 16 are dispersed within the dough 12. Additionally, a combination of chemical reactants 24 in the form of a mixture of sodium bicarbonate and citric acid is dispersed within the dough 12 as well. Finally, a fish attractant 28 is dispersed within the dough 12. Thereafter, when needed, a portion of the dough 12 is molded, formed, pinched and/or placed onto the hook 32 and the hook is placed in the water. Once placed in the water, water soluble completely biodegradable medium 12 begins to dissolve. As it begins to dissolve, the sugar crystals 16 also begin to dissolve such that the trapped $CO_2$ shatters the sugar crystals 16 into pieces 18 producing an audible sound 20 in the form of a popping, crackling sound. Additionally, the chemical reactants 24 react in the presence of water and create a fizzing, bubbling sound 20. Also, as medium 12 dissolves, fish attractant 28 is released into the water thereby releasing a scent 30. Further, as the medium 12 dissolves, the process of dissolving, as discussed above, creates multiple unpredictable movements of medium 12, and to whatever it is attached, in the water.

Certainly, other ingredients may be added to the water soluble biodegradable medium 12 as desired. For example only, and not by way of limitation, colors may be added to the medium 12. The user may find it desirable to produce water soluble biodegradable medium 12 in one color, say red, when it includes $CO_2$ charged sugar crystals 16. Thereafter, it may be desirable to produce medium 12 in a green color when it includes a combination of chemical reactants 24 and a yellow color when it includes both sugar crystals 16 and chemical reactants 24. Yet another color may be selected when a fish attractant 28 is added. Additionally, color may be added as a fish attractant itself. Again, any biodegradable ingredients now known or hereafter developed that react in the presence of water to provide movement, create sound, release scent, color or some other feature are accommodated within the scope of this invention. The description of the preferred embodiments of the invention have been presented for purposes of illustration, but are not intended to be exhaustive or to limit the invention to the form disclosed. Many modifications and variations will be apparent to those of ordinary skill in the art. As such, while the present invention has been disclosed in connection with the preferred embodiments thereof, it should be understood that there may be other embodiments which fall within the spirit and scope of the invention as defined by the following claims.

What is claimed:

1. In fishing systems, a soluble, moving, sound producing bait apparatus, the apparatus comprising:
    a) a water soluble, completely biodegradable, medium; and
    b) a water activated reactant dispersed in said water soluble medium, said reactant conformed to produce sound and create movement of the water soluble medium in the presence of water, wherein said water activated reactant comprises a gas trapped in another water soluble medium.

2. The apparatus of claim 1 further comprising an attractant dispersed within said water soluble medium.

3. The apparatus of claim 2 wherein said attractant is selected from a group including: amino acids, glycine, analine and proline.

4. The apparatus of claim 1 wherein siad water soluble medium comprises a combination of vegetable oil, cellulose and wood flour.

5. The apparatus of claim 1 wherein said water activated reactant comprises $CO_2$ charged sugar crystals.

6. The apparatus of claim 1 wherein said water activated reactant comprises $CO_2$ charged sugar crystals and a combination of sodium bicarbonate and citric acid.

7. The apparatus of claim 1 wherein said fishing system includes a hook and wherein said water soluble, completely biodegradable, medium, is attached to said hook.

8. The apparatus of claim 1 wherein said fishing system includes a lure and wherein said water soluble, completely biodegradable, medium is attached to said lure.

9. The apparatus of claim 1 wherein said fishing system includes a hook and bait and wherein said water soluble, completely biodegradable, medium is attached to said bait.

10. In a system for catching fish with a hook, a water soluble, moving, sound producing bait apparatus, the apparatus comprising:
    a) a water soluble totally biodegradable formable dough attachable to the hook;
    b) a water activated reactant dispersed within said dough, wherein said water activated reactant comprises a gas trapped in a water dissolvable retaining medium; and
    c) a fish attractant dispersed within said dough.

11. The apparatus of claim 10 wherein wherein said water soluble totally biodegradable formable dough comprises a composition of vegetable oil, cellulose and wood flour.

12. The apparatus of claim 10 wherein said water activated reactant comprises a composition of $CO_2$ charged sugar crystals.

13. The apparatus of claim 10 wherein said water activated reactant comprises a combination of $CO_2$ charged sugar crystals and a composition of sodium bicarbonate and citric acid.

14. The apparatus of claim 10 wherein said fish attractant comprises a fish attractant selected from a group including: amino acids, glycine, analine and proline.

15. In fishing systems, a soluble, moving, sound producing bait apparatus, the apparatus comprising:
    a) a water soluble, completely biodegradable, medium; and
    b) a water activated reactant dispersed in said water soluble medium, said reactant conformed to produce sound and create movement of the water soluble medium in the presence of water wherein said water activated reactant comprises a gas trapped in another water soluble medium and wherein said water activated reactant comprises $CO_2$ charged sugar crystals.

16. In fishing systems, a soluble, moving, sound producing bait apparatus, the apparatus comprising:
    a) a water soluble, completely biodegradable, medium; and
    b) a water activated reactant dispersed in said water soluble medium, said reactant conformed to produce sound and create movement of the water soluble medium in the presence of water wherein said water activated reactant comprises $CO_2$ charged sugar crystals and a combination of sodium bicarbonate and citric acid.

17. In a system for catching fish with a hook, a water soluble, moving, sound producing bait apparatus, the apparatus comprising:
    a) a water soluble totally biodegradable formable dough attachable to the hook;
    b) a water activated reactant dispersed within said dough wherein said water activated reactant comprises a gas trapped in a water dissolvable retaining medium wherein said water activated reactant composes a composition of $CO_2$ charged sugar crystals; and c) a fish attractant dispersed within said dough.

18. In a system for catching fish with a hook, a water soluble, moving, sound producing bait apparatus, the apparatus comprising:
   d) a water soluble totally biodegradable formable dough attachable to the hook;
   e) a water activated reactant dispersed within said dough wherein said water activated reactant comprises a gas tapped in a water dissolvable retaining medium wherein said water activated reactant comprises a combination of $CO_2$ charged sugar crystals and a composition of sodium bicarbonate and citric acid; and
   f) a fish attractant dispersed within said dough.

19. In fishing systems including a hook, a soluble, moving, sound producing bait apparatus, the apparatus comprising:
   a) a water soluble paste made from a combination of vegetable oil, cellulose and wood flour attachable to the hook;
   b) a combination of $CO_2$ charged sugar crystals and a mixture of sodium bicarbonate and citric acid dispersed in the water soluble paste; and
   c) a fish attractant dispersed in the water soluble paste.

20. The apparatus of claim 19 wherein said fish attractant comprises a fish attractant selected from a group including: amino acids, glycine, analine and proline.

21. The apparatus of claim 19 wherein the hook further includes a lure and the paste is attached to the hook and the lure.

22. The apparatus of claim 19 wherein bait is attached to the hook and the water soluble paste is attached to the bait.

23. In fishing systems including a hook, a soluble, moving, sound producing bait apparatus, the apparatus comprising:
   a) a water soluble paste made from a combination of vegetable oil, cellulose and wood flour attachable to the hook;
   b) a combination of $CO_2$ charged sugar crystals and a mixture of sodium bicarbonate and citric acid dispersed in the water soluble paste; and
   c) a fish attractant dispersed in the water soluble paste, wherein said fish attractant comprises a fish attractant selected from a group including: amino acids, glycine, analine and proline.

24. In fishing systems, a method of providing a soluble, moving, sound producing bait, the method comprising the steps of:
   a) mixing vegetable oil, cellulose and wood flour so as to create a completely biodegradable paste;
   b) dispersing a gas trapped within a water dissolvable retaining medium in the paste, wherein the step of dispersing a gas trapped within a water dissolvable retaining medium comprises the step of dispersing $CO_2$ charged sugar crystals within the paste;
   c) creating a mixture of a combination of chemical reactants that are activated in the presence of water and dispersing the mixture in the paste; and
   d) introducing the paste to water.

25. The method of claim 24 further comprising the step of adding a fish attractant to the paste.

26. The method of claim 24 further comprising the step of adding a fish attractant to the paste, the fish attractant selected from a group including: amino acids, glycine, analine and proline.

27. The method of claim 24 wherein the step of creating a mixture of a combination of chemical reactants comprises the step of mixing a combination of sodium bicarbonate and citric acid in the paste.

28. The method of claim 24 further comprising the step of adding a hook to the fishing system and attaching the paste to the hook.

29. The method of claim 24 further comprising the step of adding a lure to the fishing system and attaching the paste to the lure.

30. The method of claim 24 further comprising the step of adding a hook to the fishing system, attaching bait to the hook and attaching the paste to the bait.

31. A method of attracting fish with a fishing system including a hook, the method including the steps of:
   a) forming a one hundred percent biodegradable dough from a mixture of vegetable oil, cellulose and wood flour,
   b) dispersing $CO_2$ charged sugar crystals in the dough;
   c) dispersing a mixture of sodium bicarbonate and citric acid in the dough;
   d) dispersing a fish attractant in the dough; and
   e) molding a portion of the dough onto the hook and placing the hook in water.

32. The method of claim 31 wherein the step of dispersing a fish attractant in the dough includes the step of selecting a fish attractant from a group including: amino acids, glycine, analine and proline.

33. The method of claim 31 further comprising the step of adding a lure to the hook and molding a portion of the dough onto the lure.

34. The method of claim 31 further comprising the step of adding bait to the hook and molding a portion of the dough onto the bait.

35. A method of attracting fish with a fishing system including a hook, the method including the steps of;
   a) forming a one hundred sent biodegradable dough from a mixture of vegetable oil, cellulose and wood flour;
   b) dispersing $CO_2$ charged sugar crystals in the dough;
   c) dispersing a mixture of sodium bicarbonate and citric acid in the dough;
   d) dispersing a fish attractant in the dough, wherein the step of dispersing a fish attractant in the dough includes the step of selecting a fish attractant from a group including: amino acids, glycine, analine and proline; and
   e) molding a portion of the dough onto the hook and placing the hook in water.

* * * * *